(12) United States Patent  
Chakra et al.

(10) Patent No.: US 11,146,444 B2
(45) Date of Patent: Oct. 12, 2021

(54) COMPUTER SYSTEM ALERT SITUATION DETECTION BASED ON TREND ANALYSIS

(71) Applicant: International Business Machines Corporation, Armonk, NY (US)

(72) Inventors: Al Chakra, Apex, NC (US); Tian Ming Pan, Beijing (CN); Peng Fei Tian, Beijing (CN); Chu Yun Cloud Tony, Beijing (CN); Cheng Fang Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/050,309

(22) Filed: Jul. 31, 2018

(65) Prior Publication Data
US 2020/0044912 A1 Feb. 6, 2020

(51) Int. Cl.
H04L 12/24 (2006.01)

(52) U.S. Cl.
CPC ...... H04L 41/0636 (2013.01); H04L 41/0677 (2013.01); H04L 41/147 (2013.01); H04L 41/22 (2013.01)

(58) Field of Classification Search
CPC ............. H04L 41/0636; H04L 41/0677; H04L 41/147; H04L 41/22
See application file for complete search history.

(56) References Cited

U.S. PATENT DOCUMENTS

| 6,408,259 B1 | 6/2002 | Goebel et al. |
| 7,096,074 B2 | 8/2006 | Yulevitch et al. |
| 8,762,133 B2 | 6/2014 | Reiter |
| 9,640,045 B2 | 5/2017 | Reiter |
| 9,946,711 B2 | 4/2018 | Reiter et al. |
| 2003/0204368 A1* | 10/2003 | Ertin ............... G06K 9/6262 702/179 |
| 2005/0204028 A1* | 9/2005 | Bahl ............... H04L 41/0873 709/223 |
| 2014/0165207 A1* | 6/2014 | Engel ............... H04L 63/1425 726/25 |
| 2015/0081599 A1* | 3/2015 | Dobler ............... G01R 31/00 706/12 |
| 2015/0199224 A1* | 7/2015 | Mihnev ............... H04L 43/08 714/37 |

(Continued)

OTHER PUBLICATIONS

Anonymous, "Account Health Predictor for New Transitions", ip.com, Aug. 13, 2013 (7 pages).

(Continued)

Primary Examiner — Jason D Recek
(74) Attorney, Agent, or Firm — Cantor Colburn LLP; Teddi Maranzano

(57) ABSTRACT

A computer system to detect data alerts includes a data preprocessing system and a data analysis system. The data preprocessing system obtains system data of the computer system, generates predicted data based on the system data, and generates differential data indicating a difference between the system data and the predicted data. The data analysis is in signal communication with the data preprocessing system and determines that the differential data is one of expected event or an anomaly event in response to adding at least one new value from the differential data to the predicted data.

18 Claims, 6 Drawing Sheets

(56) References Cited

U.S. PATENT DOCUMENTS

| | | | | |
|---|---|---|---|---|
| 2018/0074482 A1* | 3/2018 | Cheng | ............... | G05B 23/0237 |
| 2018/0164794 A1* | 6/2018 | Nikovski | ........... | G05B 23/0283 |
| 2018/0330280 A1* | 11/2018 | Erenrich | .................. | G06N 5/04 |
| 2018/0337837 A1* | 11/2018 | Endo | .................... | H04L 43/045 |
| 2019/0166024 A1* | 5/2019 | Ho | ........................ | G06N 20/00 |
| 2019/0295001 A1* | 9/2019 | Fusco | .............. | G06F 16/24568 |

OTHER PUBLICATIONS

Anonymous, "Method and System to Identify False Alerts in Error Log", ip.com, Oct. 28, 2015 (8 pages).

Hussein, "Design of a Network-Based Anomaly Detection System Using VFDT Algorithm", Institute of Graduate Studies and Research, Eastern Mediterranean University, May 2014 (87 pages).

IBM, "Method for Problem Avoidance and Remediation by Means of incremetnal Symptom Detection", ip.com, Nov. 5, 2009 (4 pages).

Markey, "Using Decision Tree Analysis for Intrustion Detection: A How-To Guide", SANS Institute InfoSec Reading Room, Jun. 5, 2011 (33 pages).

\* cited by examiner

COMPUTER SYSTEM ALERT SITUATION DETECTION BASED ON TREND ANALYSIS

BACKGROUND

The invention relates generally to computer systems, and more particularly to, computer alert detection systems.

Today's complex IT systems and computing system involve monitoring various system messages for abnormal behavior and to diagnose and address anomalies or other issues before they result in systems failures and outages. When anomalies or issues occur, understanding the sequence of events in a chronological order becomes vital not only for troubleshooting issues but also for identifying the source and cause of the issue.

SUMMARY

According to a non-limiting embodiment, a computer system to detect data alerts includes a data preprocessing system and a data analysis system. The data preprocessing system obtains system data of the computer system, generates predicted data based on the system data, and generates differential data indicating a difference between the system data and the predicted data. The data analysis is in signal communication with the data preprocessing system and determines that the differential data is one of expected event or an anomaly event in response to adding at least one new value from the differential data to the predicted data.

According to another non-limiting embodiment, a computer implemented method is provided. The method is executed by a computer system for identifying relationships among a group of indicators. The computer system comprises a memory having computer readable instructions and a processor for executing the computer readable instructions. The computer readable instructions include instructions for obtaining system data of a computer system, generating predicted data based on the system data, and generating differential data indicating a difference between the system data and the predicted data. The instruction further include determining the differential data is one of expected event or an anomaly event in response to adding at least one new value from the differential data to the predicted data.

According to yet another non-limiting embodiment, a computer program product comprises a computer readable storage medium having program instructions embodied therewith. The program instructions are executable by a computer processor to cause the computer processor to perform a method comprising obtaining system data of a computer system, generating predicted data based on the system data, and generating differential data indicating a difference between the system data and the predicted data. The method further comprises determining the differential data is one of expected event or an anomaly event in response to adding at least one new value from the differential data to the predicted data.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
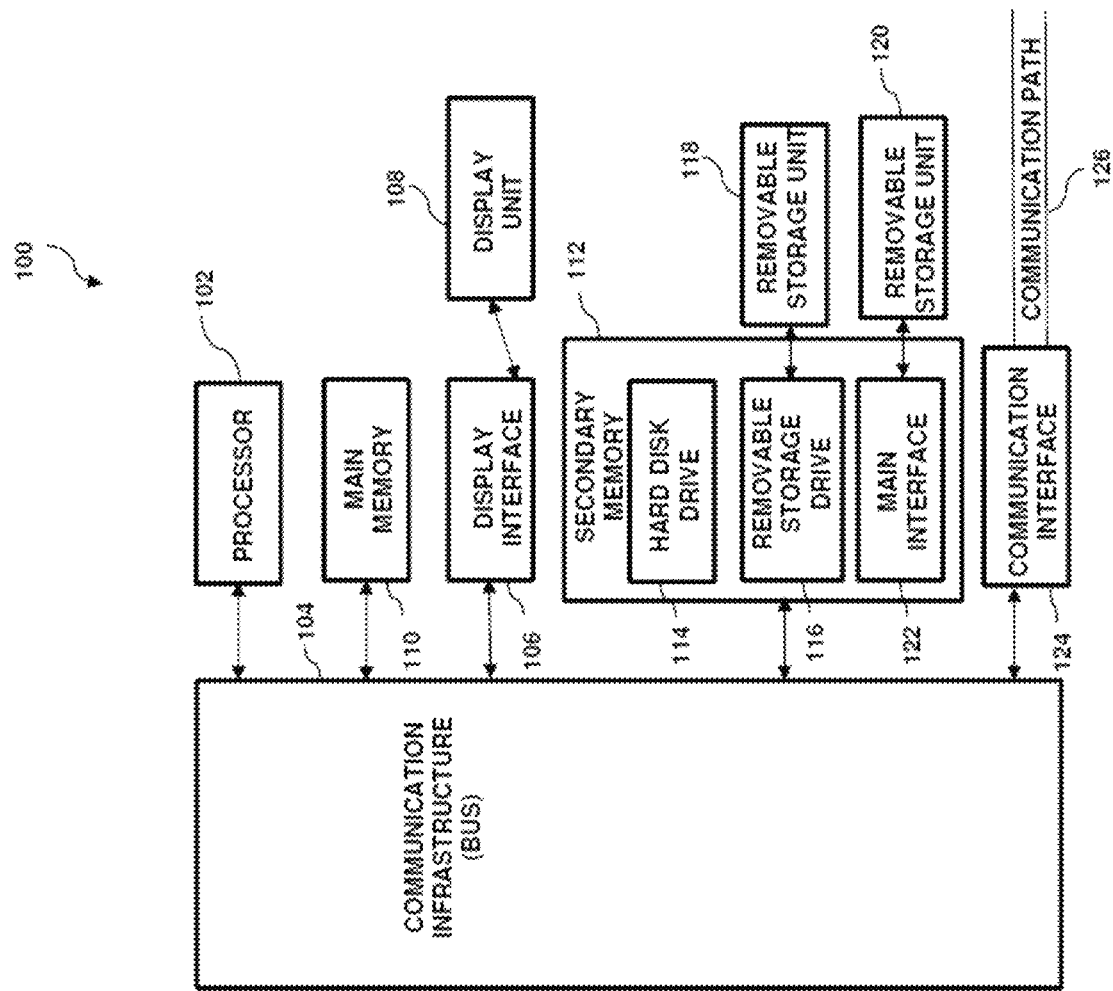
FIG. 1 depicts an exemplary computer system capable of implementing one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, providing computing analysis as a service typically involves providing various diagnostic reports and routine system health analysis audits to a client. Most, if not, all customers look hard at systems performance and after months and years of running workloads, they establish a norm or a baseline. When these baselines suddenly change, customers get alarmed and seek an explanation.

Baseline changes in the system production data are can be detected, for example, following an upgrade of a client's system. However, the application workload running on the system typically remains the same. Therefore, it can be difficult to detect an advanced alert situation and/or an abnormal trend at its beginning stage following a system upgrade. Further, when a system problem or issue is detected, it can be challenging to determine at what point in time the alert situation started and whether the issue or problem is becoming worse.

Various non-limiting embodiments described herein aim to detect a computing system advanced alert situation by generating a prediction model that is based on a transaction workload pattern trend analysis. The source of the alert situation is then traced back via a decision tree analysis, along with various predictive algorithms such as, for example, a taillight analysis coupled with a predicted model. In at least one embodiment, the advanced alert situation evaluation determines an alert exception scenario (e.g., an acceptable differential in the system data) that tolerates variance from some extent in order to avoid reporting an incorrect alert, or "false alert." For example, a difference in a sampled portion of the system's production data and prediction may be expected (i.e., an exception scenario) or may be a true anomaly that warrants an alert.

Turning now to a more detailed description of aspects of the present invention, FIG. 1 illustrates a high-level block diagram showing an example of a computer-based system 100 useful for implementing one or more embodiments of the invention. Although one exemplary computer system 100 is shown, computer system 100 includes a communication path 126, which connects computer system 100 to additional systems and may include one or more wide area networks (WANs) and/or local area networks (LANs) such as the Internet, intranet(s), and/or wireless communication network(s). Computer system 100 and additional systems are in communication via communication path 126, (e.g., to communicate data between them).

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by a removable storage drive 116. As will be appreciated, removable storage unit 118 includes a computer readable medium having stored therein computer software and/or data.

In some alternative embodiments of the invention, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etc. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110, and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Figure 2:
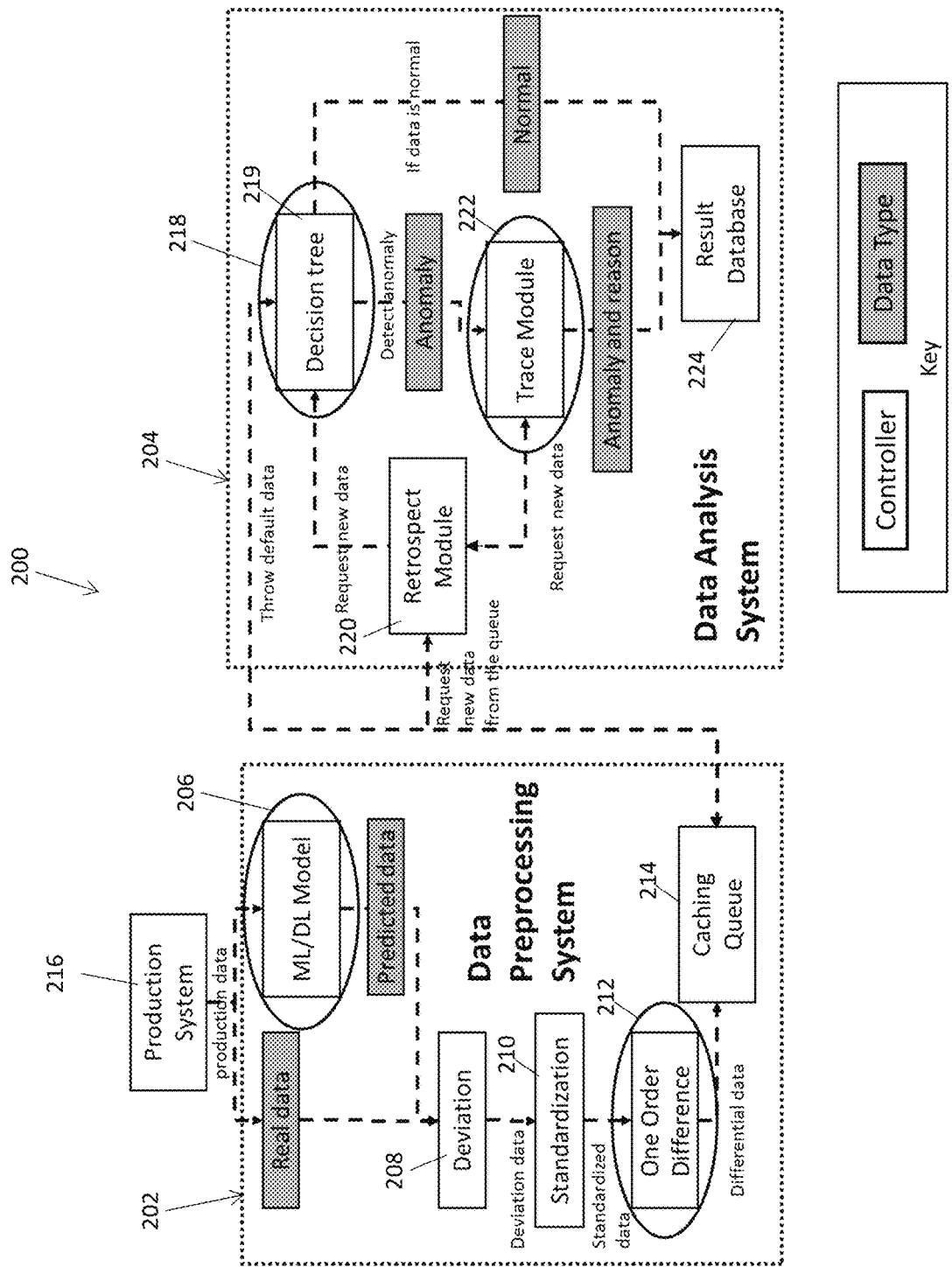
FIG. 2 is a block diagram illustrating a data alert system according to a non-limiting embodiment.

Referring now to FIG. 2, a data alert system 200 is illustrated according to a non-limiting embodiment. The data alert system 200 includes a data preprocessing system 202 in signal communication with a data analysis system 204. The data preprocessing system 202 obtains production data to generate real data and predicted data. The real data and predicted data are then utilized together to generate differential data, which is utilized by the data analysis system 204 to detect an anomaly.

The data preprocessing system 202 includes a machine learning/deep learning (ML/DL) controller 206, a deviation controller 208, a standardization controller 210, a differential data controller 212, and a caching queue 214. The data preprocessing system 202 obtains production data from a production system 216 and delivers it to the ML/DL controller 206 and the deviation controller 208. ML/DL controller 206 processes the production data and generates predicted data. The predicted data provides a core corpus of data (e.g., a critical mass), which can be aggregated by the data preprocessing system 202 to generate preprocessed data, i.e., differential data.

In at least one embodiment, the predicted data predicts the expected trend curl after a system upgrade. After a system upgrade, the transaction rate can change such that the new baseline will be changed accordingly. In this case, the change typically has few relationships with time, but is strongly coupled with the transaction rate. For example, predicted storage usage may be determined using transaction rate as the main factor, rather than time.

The deviation controller 208 obtains the prediction data generated by the ML/DL controller 206, along with the production data which is treated as "real data". Accordingly, the deviation controller 208 detects a deviation by subtracting the real data and the predicted data. The deviation controller 208 generates and outputs the deviation data indicating the detected deviation.

The standardization controller 210 receives the deviation data and calculates a standardization of the deviation. Accordingly, the standardization controller 210 outputs the standardized data indicating the standardization of the detected deviation. In one or more embodiments, the standardization can include reducing the data set from the more frequently captured data by discarding every other data point. Likewise, the standardization can include interpolating or duplicating data in the less frequently captured data set. Additional data standardization techniques can also be performed <Inventors, is the description of the standardization process accurate and are there any other examples of equations or particular algorithms the standardization controller 210 implements to calculate the standardized data. Standardization techniques include, but are not limited to, (1) "0-1 scaling techniques", (2) "range division techniques", (3) "Z-score scaling techniques", and (4) "standard deviation division techniques".

The 0-1 scaling technique involves recalculating each variable in the data set as (V−min V)/(max V−min V), where V represents the value of the variable in the original data set. This technique allows variables to have differing means and standard deviations but equal ranges. In this case, there is at least one observed value at the 0 and 1 endpoints.

The range division technique recalculates each variable as V/(max V−min V). In this case, the means, variances, and ranges of the variables are still different, but at least the ranges are likely to be more similar.

The Z-score scaling technique recalculates variables as (V−mean of V)/s, where "s" is the standard deviation. As a result, all variables in the data set have equal means (0) and standard deviations (1) but different ranges.

The standard deviation division technique involves dividing each value by the standard deviation. This method produces a set of transformed variables with variances of 1, but different means and ranges.

The differential data controller 212 use a differential algorithm to determine a feature of the deviation. In at least one embodiment, the differential algorithm is a first order differential equation, which generates the feature of the deviation. The feature deviation includes, for example, sequentially obtained real data (e.g., . . . , 190, 156, 118, 230, 178, 199, 135), while the ML model provides corresponding prediction data (e.g., . . . , 190, 156, 116, 226, 172, 193, 127). After performing the deviation process, the deviation data is determined (e.g., 0, 0, 2, 4, 6, 6, 8), and the standardization output can be generated (e.g., 0, 0, 1, 2, 3, 3, 4), A one order difference method can be applied to determine a difference between the leading value and the following value. In this example, the one order different would generate (e.g., [0, 1, 1, 1, 0, 1), thus generating 6 results from 7 values), In this manner, a quick indication that that the real data is increasing rapidly based on to the preprocessing.

The caching queue 214 can store the production data and predicted data. The caching queue 214 also stores the result of the differential data controller 212 and transfers it to the data analysis system 204. The caching queue 214 is also configured to provide additional new data to the data analysis system 204 upon request.

Still referring to FIG. 2, the data analysis system 204 obtains the differential data from the caching queue 214, and performs a trend analysis to determine whether the differential data is normal (i.e., expected) or is an anomaly (i.e., unexpected). If an anomaly is detected, the data analysis system 204 can further output a reason for the anomaly. In at least one non-limiting embodiment, the data analysis system 204 includes a decision tree controller 218, a retrospect controller 220, a trace controller 222, and a result database/controller 224.

The decision tree controller 218 executes a decision tree algorithm 219 to determine whether the differential data is normal is an anomaly. When the data is normal (i.e., expected), the decision tree controller 218 outputs the normal data result, and the data analysis system 204 seeds the state (i.e., the normal result) to the result database/controller 224. When, however, an anomaly is detected, the anomaly data result is output from the decision tree controller 218.

The trace controller 222 is in signal communication with the retrospect module 220 and the decision tree controller 218. The trace module 222 receives the anomaly data result from the decision tree controller 218 and operates to identify the particular anomaly included in the data result, along with aiming to determine the reason for the anomaly.

When the particular anomaly and reason cannot be determined using the current anomaly data, the trace controller 222 requests additional new differential data. The retrospect controller 220 obtains the new differential data from the caching queue 214 and delivers it to the decision tree controller 218 and the trace controller 222. In at least one embodiment, the retrospect controller 220 obtains the last data before the selected period. Accordingly, the decision tree controller 218 and the trace controller 222 continues to step through a decision tree and adds new data until determining the particular anomaly and the actual reason for the anomaly. The particular anomaly and the actual reason for the anomaly is then output and stored in the resulting database 224. In at least one embodiment, the results stored in the result database 224 can be output to a graphic user interface (GUI) (not shown) and displayed for visualization and further analysis.

Figure 3:
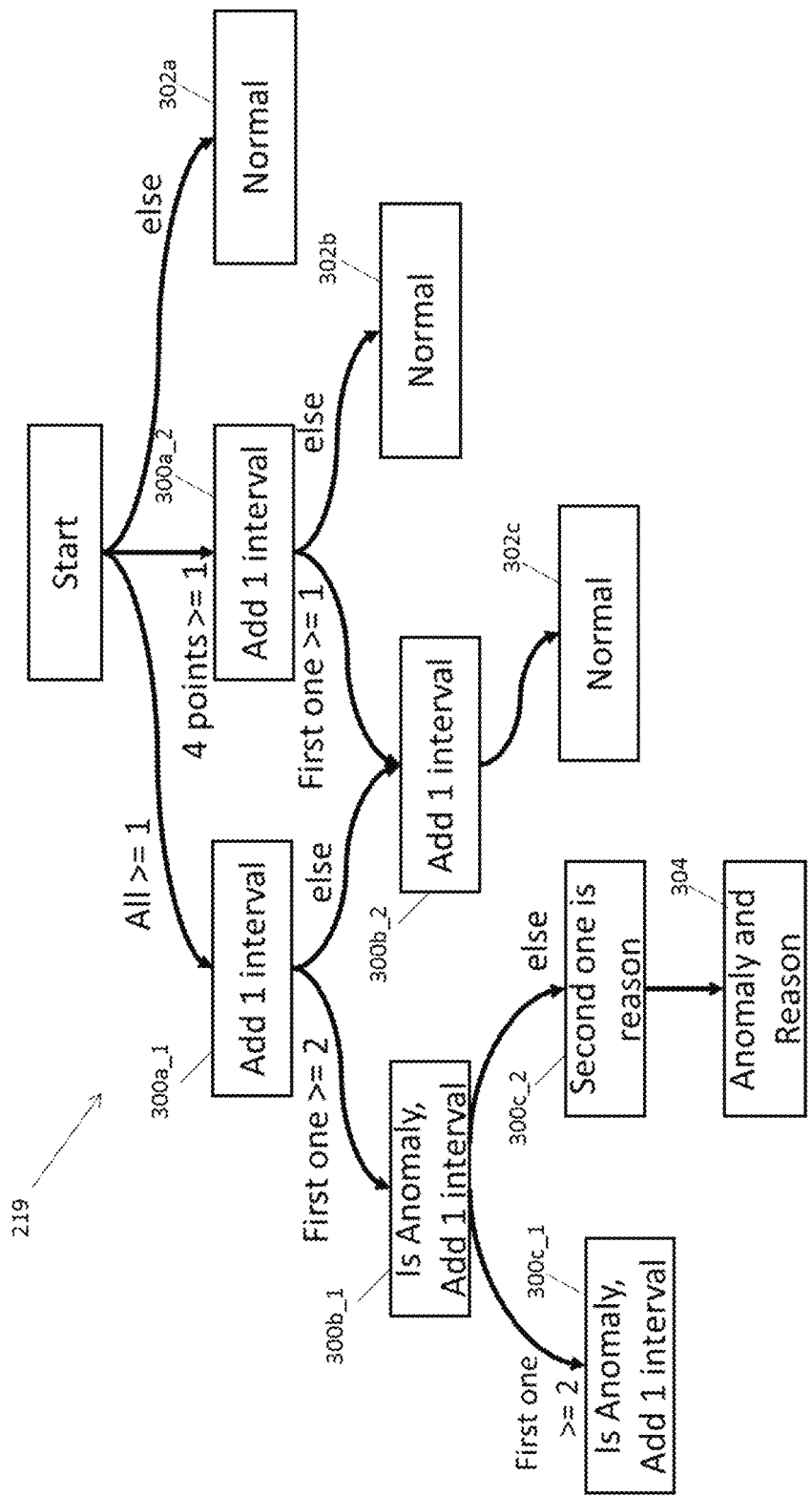
FIG. 3 is a structural diagram of a decision tree algorithm executed by the alert situation detection system according to a non-limiting embodiment.

Turning to FIG. 3, a structural diagram of a decision tree algorithm 219 is illustrated according to a non-limiting embodiment. The decision tree algorithm 219 is structured as a hierarchy of progressing levels, with each level including a plurality of nodes 300a-300c. The output of a first node at one level is delivered to a second node at the next level via a branch. Each branch is assigned a "truth" scenario, and the "truth" of each branch leads to the next completed decision of the decision tree algorithm 219. Accordingly, the decision tree algorithm 219 can branch through the nodes 300a-300c until reaching a normal data output 302 or an anomaly and result output 304.

Figure 4:
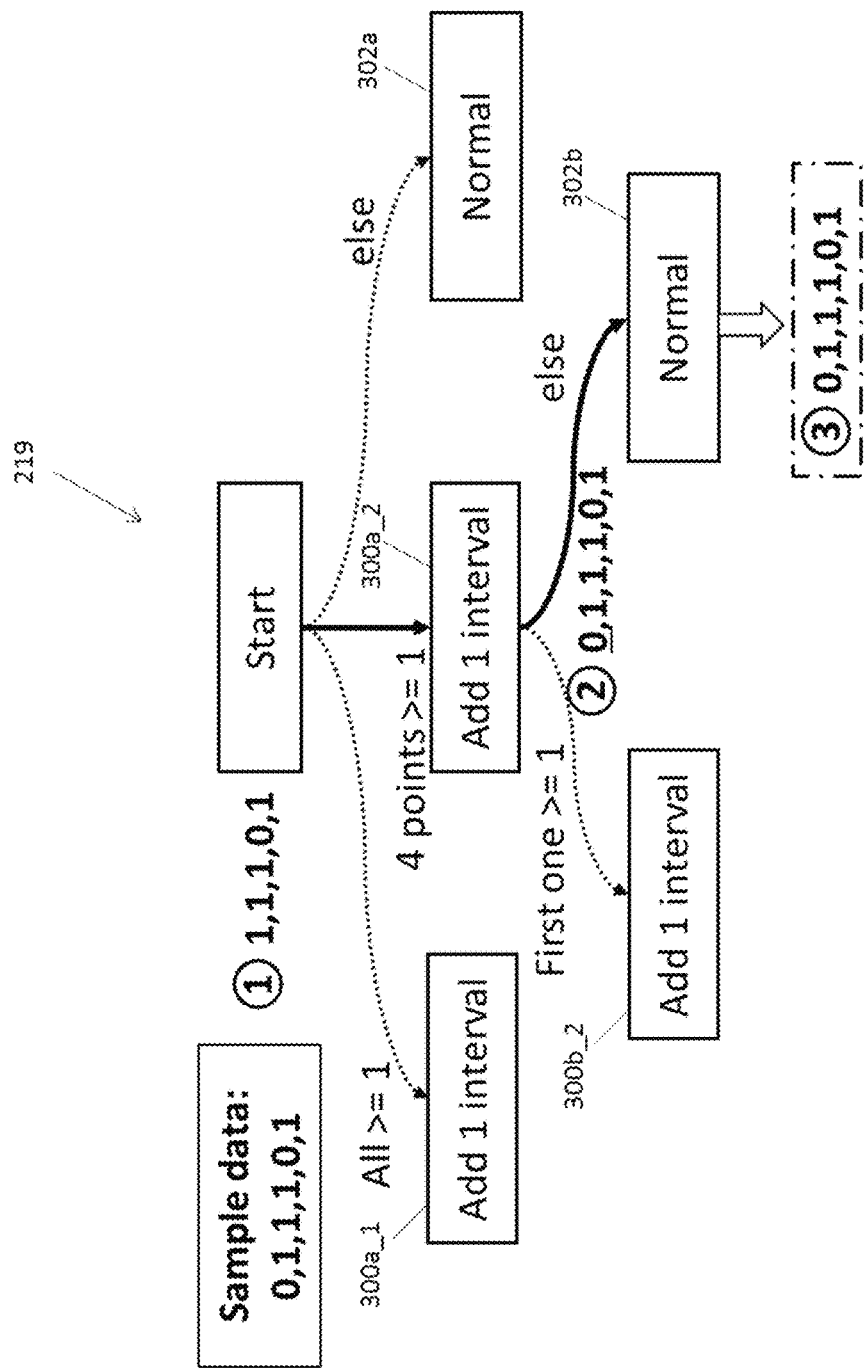
FIG. 4 depicts the execution of the decision tree algorithm illustrated in FIG. 3 resulting in a normal data output according to a non-limiting embodiment.

FIG. 4 depicts the execution of the decision tree algorithm 219 resulting in a normal data output according to a non-limiting embodiment. In at least one embodiment, the decision tree algorithm 219 analyzes sample data (e.g., 0, 1, 1, 1 0, 1) of the system data following a system update. The sample data can be viewed, for example, as a final result to be analyzed. Upon initialization, the decision tree algorithm 219 obtains preprocessed data (e.g., 1, 1, 1, 0, 1) at operation (1). After preprocessing, the queue is [ . . . , 0, 1, 1, 1, 0, 1]. A decision on which branch to proceed is then performed based on values of the preprocessed data (1, 1, 1, 0, 1). In this example, four values of the preprocessed data (1, 1, 1, 0, 1) are greater than or equal to "1"; however, not all values of the preprocessed data (1, 1, 1, 0, 1) are greater than or equal to "1". Accordingly, the decision tree algorithm 219 branches to the following child node 300a_2 at the next level, and adds new data (e.g., "0") to the preprocessed data to generate an updated preprocessed data (0, 1, 1, 1, 0, 1) at operation (2). In at least one embodiment, the new data is the next value obtained from the caching queue. A decision on which branch to proceed is again performed based on values of the updated preprocessed data (0, 1, 1, 1, 0, 1). In this example, the updated preprocessed data (0, 1, 1, 1, 0, 1) matches the sample data (0, 1, 1, 0, 1). Accordingly, the decision tree algorithm 219 branches to the normal output decision 302b at the next level, and outputs the normal data at operation (3).

Figure 5:
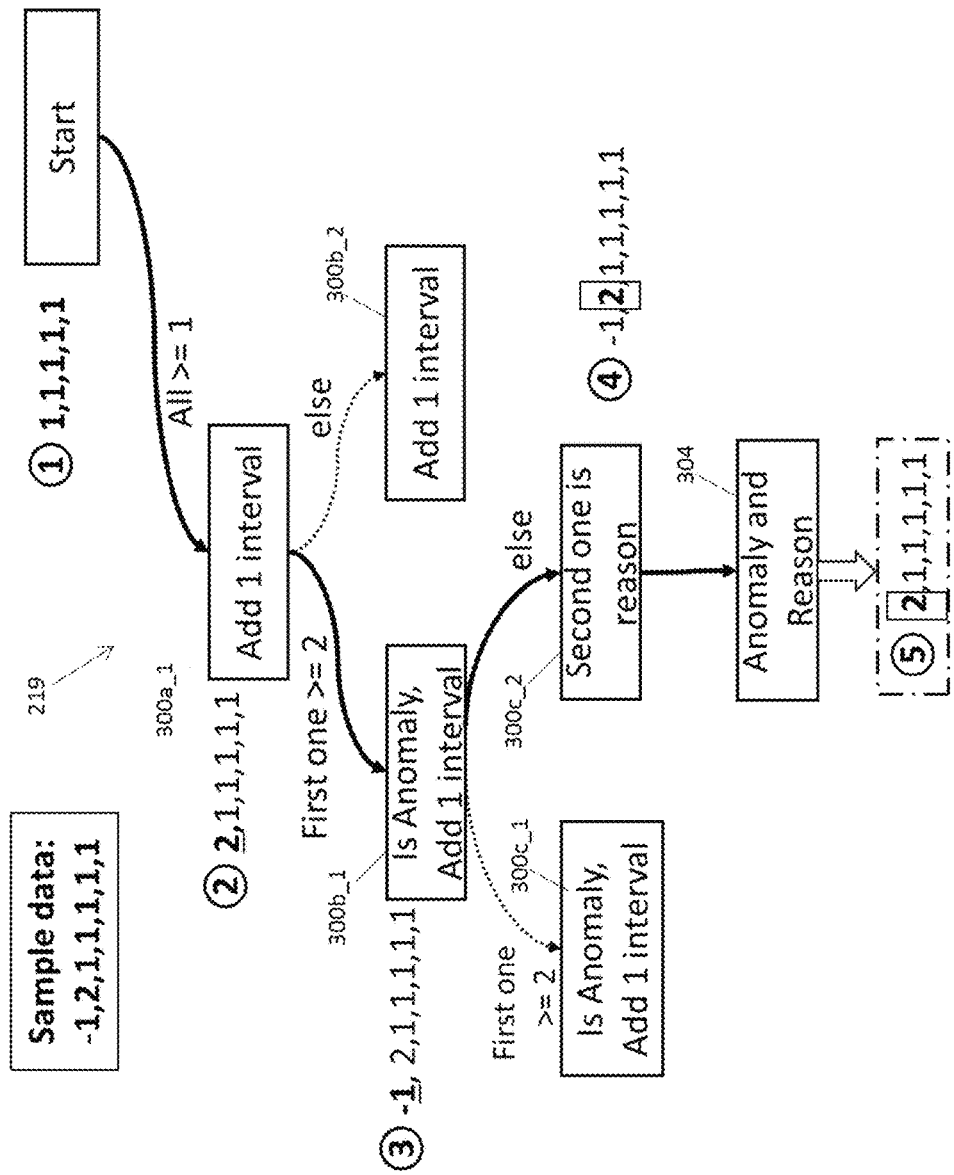
FIG. 5 depicts the execution of the decision tree algorithm illustrated in FIG. 3 resulting in an anomaly output according to a non-limiting embodiment.

FIG. 5 depicts execution of the decision tree algorithm 219 resulting in an anomaly data output according to a non-limiting embodiment. In this example, the decision tree algorithm 219 analyzes sample data (e.g., 1, 1, 1, 1, 1) of the system data following a system update. A decision on which branch to proceed is performed based on values of the preprocessed data (1, 1, 1, 1, 1). In this example, all values of the preprocessed data (1, 1, 1, 1, 1) are greater than or equal to "1". Accordingly, the decision tree algorithm 219 branches to the following child node 300a_1 at the next level, and adds new data (e.g., "2") to the preprocessed data to generate an updated preprocessed data (2, 1, 1, 1, 1, 1) at operation (2). Referring to the example described above, if the prediction data is [ . . . , 160, 190, 156, 116, 226, 172, 193, 127], but the real data is [ . . . , 162, 190 160, 122, 234, 182, 205, 141], then the preprocess results should be [ . . . , 2, 0, 4, 6, 8, 10, 12, 14], [ . . . , 1, 0, 2, 3, 4, 5, 6, 7], and [ . . . , −1, 2, 1, 1, 1, 1, 1]. Therefore, the newly added value "2" becomes the sixth value in the queue. A decision on which branch to proceed is then again performed based on values of the updated preprocessed data (e.g., 2, 1, 1, 1, 1, 1).

Still referring to FIG. 5, the first value of the updated preprocessed data (2, 1, 1, 1, 1, 1) is greater than or equal to "2". Accordingly, the decision tree algorithm 219 branches to the following child node 300b_1 at the next level. At operation (3), an anomaly is detected and new data (e.g., "−1") is added to the preprocessed data to again generate updated preprocessed data (−1, 2, 1, 1, 1, 1, 1). In this example, the first value ("−1") of the updated preprocessed data (−1, 2, 1, 1, 1, 1, 1) is not greater than or equal to 2. Accordingly, the decision tree algorithm 219 branches to the following child node 300c_2 at the next level, and determines that the second value "2" of the updated preprocessed data (−1, 2, 1, 1, 1, 1, 1) is the reasons or cause of the anomaly at operation (4). Accordingly, the decision tree algorithm 219 branches to the normal output decision 304 at the next level, and outputs the anomaly data and the reasons for the anomaly at operation (5).

Figure 6:
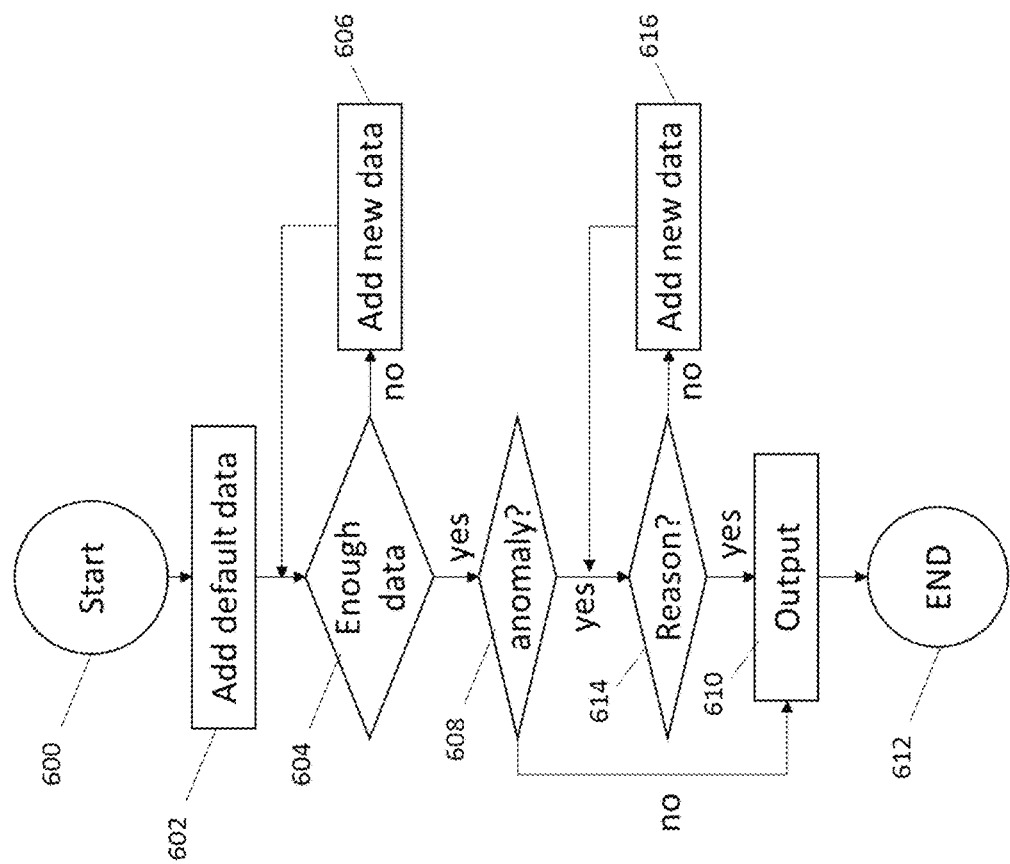
FIG. 6 is a flow diagram illustrating a method of detecting an alert situation based on a trend analysis according to a non-limiting embodiment.

Referring now to FIG. 6, a flow diagram illustrates a method of detecting an alert situation based on a trend analysis according to a non-limiting embodiment. The method begins at operation 600, and at operation 602 default data is added to the system. The default data can be obtained, for example, from data stored in the caching queue. In at least one embodiment, the addition of default data includes using a default decision tree to initially select the differential value of several suitable interval deviations, while allowing the transition to different child nodes. At operation 604, a determination is made as to whether enough default data to perform a trend analysis has been added to the system. In at least one embodiment a data amount threshold can be determined. Accordingly, when the amount of default data added is below the threshold, new data is added to the system at operation 606 and the method returns to operation 604 to determine whether enough data has been added to perform a trend analysis. When, however, the amount of added data is equal to or exceeds the data amount threshold, the system can determine that enough default data has been added to perform a proper data trend analysis, and the method proceeds to determine whether an anomaly is present at operation 608. When the trend analysis indicates that the added data is normal, the method proceeds to operation 610 and outputs a result indicating that the data is normal. The method then ends at operation 612.

When, however, the trend analysis indicates that the added data is abnormal, i.e., that an anomaly is present, the method determines whether a reason for the anomaly can be identified at operation 614. When the reason cannot be identified, more new data is added to the system at operation 616, and the method returns to operation 614 to determine whether the reason for the anomaly can be identified. In at least one embodiment, the last value before the selected data is added to the first array list until the reason(s) for the anomaly can be identified. When the reason can be identified, the method proceeds to operation 610 to output the identified reason for the anomaly, and the method ends at operation 612. In one or more embodiments, the system includes a graphical user interface (GUI) capable of displaying the anomaly and one or more graphical, audio and/or light-emitting alerts indicating that an anomaly has been detected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system configured to detect data alerts, the computer system comprising:
    a data preprocessing system configured to obtain sequential generated system data of the computer system, sequentially generate predicted data based on the system data, and sequentially generate preprocessed differential data indicating a difference between the system data and the predicted data; and
    a data analysis system in signal communication with the data preprocessing system, the data analysis system configured to select a first portion of the preprocessed differential data as sample data and to determine that the sample data includes one of an expected event corresponding to the system data generated by the data preprocessing system or an anomaly event corresponding to the system data generated by the data preprocessing system, in response to failing to determine the expected event or the anomaly event, continuously adding at least one new value from a second portion of the preprocessed differential data excluded from the sample data to the sample data until the expected event or the anomaly event is determined, wherein the at least one new value is a next sequential value included the second portion of the preprocessed differential data that is excluded from the sample data.

2. The computer system of claim 1, wherein in response to determining the sample data includes the anomaly event, the data analysis system determines a reason for the anomaly event based on the at least one new value.

3. The computer system of claim 2, further comprising a graphic user interface in signal communication with the data analysis system, the graphic user interface configured to display anomaly data indicating the anomaly event and the reason for the anomaly event.

4. The computer system of claim 3, wherein the data analysis system determines the expected event or the anomaly event based on a decision tree that compares the sample data and the predicted data.

5. The computer system of claim 4, wherein the decision tree has as a hierarchy of progressing levels, each level including a plurality of nodes, wherein an output of a first node at one level is delivered to a second node at a next level via a branch, and wherein each branch is assigned a truth scenario.

6. The computer system of claim 5, wherein the truth scenario of each branch leads to a next completed decision indicated by the decision tree.

7. The computer system of claim 6, wherein the decision tree continues branching through the nodes until determining the expected event or the anomaly event.

8. The computer system of claim 1, wherein the at least one new value from the second portion of the preprocessed differential data excluded from the sample data is added to the sample data without changing values of the sample data to generate updated sample data, and wherein the expected event or the anomaly event is determined based on the updated sample data now including the unchanged values of the sample data and the at least one new value.

9. A computer implemented method executed by a computer system for identifying relationships among a group of indicators, the computer system comprises:
a memory having computer readable instructions;
a processor for executing the computer readable instructions, the computer readable instructions including instructions for:
obtaining sequential generated system data of a computer system;
sequentially generating predicted data based on the system data;
sequentially generating preprocessed differential data indicating a difference between the system data and the predicted data; and
selecting a first portion of the preprocessed differential data as sample data and determining the sample data includes one of an expected event corresponding to the system data generated by the data preprocessing system or an anomaly event corresponding to the system data generated by the data preprocessing system; and
in response to failing to determine the expected event or the anomaly event, continuously adding at least one new value from a second portion of the preprocessed differential data excluded from the sample data to the sample data until the expected event or the anomaly event is determined, wherein the at least one new value is a next sequential value included the second portion of the preprocessed differential data that is excluded from the sample data.

10. The method of claim 9, further comprising determining a reason for the anomaly event based on the at least one new value in response to determining the sample data includes the anomaly event.

11. The method of claim 10, further comprising displaying, via a graphic user interface, anomaly data indicating the anomaly event and the reason for the anomaly event.

12. The method of claim 11, further comprising determining the expected event or the anomaly event by comparing, via a decision tree, the sample data and the predicted data.

13. The method of claim 12, wherein the decision tree has as a hierarchy of progressing levels, each level including a plurality of nodes, wherein an output of a first node at one level is delivered to a second node at a next level via a branch, and wherein each branch is assigned a truth scenario.

14. The method of claim 13, wherein the truth scenario of each branch leads to a next completed decision indicated by the decision tree.

15. The method of claim 14, further comprising continuously branching through the nodes until determining the expected event or the anomaly event.

16. A computer program product comprising a computer readable storage medium having program instructions embodied therewith the program instructions executable by a computer processor to cause the computer processor to perform a method, comprising:
obtaining sequential generated system data of a computer system;
sequentially generating predicted data based on the system data;
sequentially generating preprocessed differential data indicating a difference between the system data and the predicted data; and
selecting a first portion of the preprocessed differential data as sample data and determining the sample data includes one of an expected event corresponding to the system data generated by the data preprocessing system or an anomaly event corresponding to the system data generated by the data preprocessing system; and
in response to failing to determine the expected event or the anomaly event, continuously adding at least one new value from a second portion of the preprocessed differential data excluded from the sample data to the sample data until the expected event or the anomaly event is determined, wherein the at least one new value is a next sequential value included the second portion of the preprocessed differential data that is excluded from the sample data.

17. The computer program product of claim 16, wherein the method further comprises determining a reason for the anomaly event based on the at least one new value in response to determining the sample data includes the anomaly event.

18. The computer program product of claim 17, wherein the method further comprises:

displaying, via a graphic user interface, anomaly data indicating the anomaly event and the reason for the anomaly event.

* * * * *